(12) United States Patent
Liu et al.

(10) Patent No.: US 11,485,840 B2
(45) Date of Patent: Nov. 1, 2022

(54) POLYMER BLENDS FOR USE IN MULTILAYER STRUCTURE AND MULTILAYER STRUCTURES COMPRISING THE SAME

(71) Applicant: Dow Global Technologies LLC, Midland, MI (US)

(72) Inventors: Andong Liu, Shanghai (CN); Guihong Liao, Shanghai (CN); Jianping Pan, Shanghai (CN); Peng Gao, Shanghai (CN); Hongyu Chen, Shanghai (CN); Yi Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 304 days.

(21) Appl. No.: 16/470,695

(22) PCT Filed: Jan. 11, 2017

(86) PCT No.: PCT/CN2017/070834
§ 371 (c)(1),
(2) Date: Jun. 18, 2019

(87) PCT Pub. No.: WO2018/129669
PCT Pub. Date: Jul. 19, 2018

(65) Prior Publication Data
US 2020/0087497 A1    Mar. 19, 2020

(51) Int. Cl.

| | | |
|---|---|---|
| *C08L 23/08* | (2006.01) | |
| *B32B 5/02* | (2006.01) | |
| *B32B 15/082* | (2006.01) | |
| *B32B 15/20* | (2006.01) | |
| *B32B 27/08* | (2006.01) | |
| *B32B 27/12* | (2006.01) | |
| *B32B 27/30* | (2006.01) | |
| *B32B 27/32* | (2006.01) | |
| *B32B 27/34* | (2006.01) | |
| *B32B 37/15* | (2006.01) | |
| *C08J 5/12* | (2006.01) | |
| *C08J 5/18* | (2006.01) | |

(52) U.S. Cl.
CPC .......... *C08L 23/0869* (2013.01); *B32B 5/022* (2013.01); *B32B 5/024* (2013.01); *B32B 5/028* (2013.01); *B32B 15/082* (2013.01); *B32B 15/20* (2013.01); *B32B 27/08* (2013.01); *B32B 27/12* (2013.01); *B32B 27/308* (2013.01); *B32B 27/32* (2013.01); *B32B 27/34* (2013.01); *B32B 37/153* (2013.01); *C08J 5/121* (2013.01); *C08J 5/18* (2013.01); *B32B 2250/03* (2013.01); *B32B 2270/00* (2013.01); *C08J 2323/08* (2013.01); *C08J 2423/00* (2013.01); *C08J 2423/06* (2013.01); *C08J 2423/08* (2013.01); *C08L 2203/16* (2013.01); *C08L 2205/025* (2013.01); *C08L 2205/03* (2013.01); *C08L 2207/066* (2013.01)

(58) Field of Classification Search
CPC ....... B32B 27/30; B32B 27/308; C08F 20/02; C08F 20/04; C08F 20/08; C08F 20/10; C08F 20/12; C08L 33/02; C08L 33/04; C08L 33/06; C08L 33/08; C08L 33/10
See application file for complete search history.

(56) References Cited

U.S. PATENT DOCUMENTS

| | | | |
|---|---|---|---|
| 4,678,836 A | 7/1987 | McKinney et al. | |
| 6,437,046 B1 | 8/2002 | Morris | |
| 6,835,269 B1 * | 12/2004 | Miharu | B32B 27/36 156/244.11 |
| 6,903,161 B2 | 6/2005 | Morris | |
| 7,767,311 B2 | 8/2010 | Chou | |
| 8,541,073 B2 | 9/2013 | Kendig et al. | |
| 2012/0074020 A1 | 3/2012 | Kendig et al. | |
| 2014/0255683 A1 | 9/2014 | Amici et al. | |
| 2018/0304602 A1 | 10/2018 | Perez et al. | |

FOREIGN PATENT DOCUMENTS

| | | |
|---|---|---|
| CN | 104371596 A | 2/2015 |
| DE | 2617411 A1 | 11/1977 |
| EP | 0138083 A1 | 4/1985 |
| EP | 1300238 A2 | 4/2003 |
| JP | H06-239721 A | 8/1994 |
| JP | 2003192849 A | 7/2003 |
| JP | 2005-187744 A | 7/2005 |
| JP | 2007084691 A | 4/2007 |

(Continued)

OTHER PUBLICATIONS

PCT/CN2017/070834, International Search Report and Written Opinion dated Sep. 30, 2017.

(Continued)

*Primary Examiner* — Zachary M Davis

(57) ABSTRACT

The present invention provides polymer blends that can be used in a multilayer structure and to multilayer structures comprising one or more layers formed from such blends. In one aspect, a polymer blend comprises (a) a copolymer comprising ethylene and at least one of acrylic acid and methacrylic acid having an acid content of 2 to 21 weight percent based on the weight of the copolymer, wherein the amount of copolymer (a) comprises 20-80 weight percent of the blend based on the total weight of the blend, and (b) a copolymer comprising ethylene and at least one of methyl acrylate and ethyl acrylate having an acrylate content of 5 to 30 weight percent based on the weight of the copolymer, wherein the amount of copolymer (b) comprises 10 to 50 weight percent of the blend based on the total weight of the blend, wherein the amount of copolymer (a) and copolymer (b) is at least 70 weight percent of the blend based on the total weight of the blend.

18 Claims, No Drawings

(56) References Cited

FOREIGN PATENT DOCUMENTS

| | | |
|---|---|---|
| WO | 2005113670 A1 | 12/2005 |
| WO | 2006019922 A1 | 2/2006 |
| WO | 2006041654 A1 | 4/2006 |
| WO | 2007041309 A1 | 4/2007 |
| WO | 2008005110 A1 | 1/2008 |
| WO | 2010112147 A1 | 10/2010 |
| WO | 2017087776 A1 | 5/2017 |

OTHER PUBLICATIONS

PCT/CN2017/070834, International Preliminary Report on Patentability dated Jul. 25, 2019.

* cited by examiner

POLYMER BLENDS FOR USE IN MULTILAYER STRUCTURE AND MULTILAYER STRUCTURES COMPRISING THE SAME

FIELD

The present invention relates to polymer blends that can be used in a multilayer structure and to multilayer structures comprising one or more layers formed from such polymer blends.

INTRODUCTION

Ethylene acrylic acid copolymers ("EAA"), such as those available from The Dow Chemical Company under the name PRIMACOR™ provide excellent adhesion to metal foils, paper, and other substrates. For this reason, EAA resins are typically used as tie layers for such substrates in multilayer packaging structures. Despite the usefulness of EAA resins in tie layers, in some instances, the EAA in a tie layer can contribute negatively to the temperature sensitivity of the tie layer.

Other approaches have involved blending EAA with polyethylene. However, some such approaches experienced processing issues in applications such as extrusion coating.

Thus, there remains a need for alternative approaches for polymers that can provide desirable adhesion to foil, metallized film, or similar substrates in multilayer structures while minimizing undesirable effects.

SUMMARY

The present invention provides polymer blends that in some aspects provide desirable adhesion when used as a tie layer in a multilayer structure. Further, in some aspects, the present invention facilitates extrusion coating to form multilayer structures while minimizing undesirable effects such as draw down and neck-in. For example, some embodiments of the present invention comprise a carefully selected blend of resins that achieve desirable adhesion to substrates such as metal foils while minimizing undesirable effects.

In one aspect, the present invention provides a polymer blend that comprises a copolymer comprising ethylene and at least one of acrylic acid and methacrylic acid having an acid content 2 to 21 weight percent based on the weight of the copolymer, wherein the amount of copolymer (a) comprises 20-80 weight percent of the blend based on the total weight of the blend, and (b) a copolymer comprising ethylene and at least one of methyl acrylate and ethyl acrylate having an acrylate content of 5 to 30 weight percent based on the weight of the copolymer, wherein the amount of copolymer (b) comprises 10 to 50 weight percent of the blend based on the total weight of the blend, wherein the amount of copolymer (a) and copolymer (b) is at least 70 weight percent of the blend based on the total weight of the blend. In some embodiments, the melt index ($I_2$) ratio of copolymer (a) to copolymer (b) ($I_2$ of copolymer (a)/$I_2$ of copolymer (b)) is greater than 2.

In another aspect, the present invention provides (a) a copolymer comprising ethylene and at least one of acrylic acid and methacrylic acid having an acid content of 2 to 21 weight percent based on the weight of the copolymer and having a melt index ($I_2$) of 1 to 40 g/10 minutes, wherein the amount of copolymer (a) comprises 1 to 90 weight percent of the blend based on the total weight of the blend, and (b) a copolymer comprising ethylene and at least one of methyl acrylate and ethyl acrylate having an acrylate content of 5 to 30 weight percent based on the weight of the copolymer and having a melt index ($I_2$) of 0.5 to 20 g/10 minutes, wherein the amount of copolymer (b) comprises 1 to 50 weight percent of the blend based on the total weight of the blend, wherein the melt index ratio of copolymer (a) to copolymer (b) ($I_2$ of copolymer (a)/$I_2$ of copolymer (b)) is greater than 2.

In another aspect, the present invention provides a multilayer structure comprising at least two layers, each layer having opposing facial surfaces, wherein Layer A comprises any of the polymer blends of the present invention disclosed herein, and wherein Layer B comprises a substrate, wherein a top facial surface of Layer B is in adhering contact with a bottom facial surface of Layer A. In some embodiments, the substrate comprises aluminum foil, metallized film, a woven mat, a nonwoven mat, or a scrim/

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

"Polypropylene" means a polymer having greater than 50 wt % units derived from propylene monomer.

The term, "ethylene/α-olefin interpolymer," as used herein, refers to an interpolymer that comprises, in polymerized form, a majority amount of ethylene monomer (based on the weight of the interpolymer), and a α-olefin.

The term, "ethylene/α-olefin copolymer," as used herein, refers to a copolymer that comprises, in polymerized form, a majority amount of ethylene monomer (based on the weight of the copolymer), and a α-olefin, as the only two monomer types.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

The term "multilayer structure" refers to any structure comprising two or more layers having different compositions and includes, without limitation, multilayer films, multilayer sheets, laminated films, multilayer rigid containers, multilayer pipes, and multilayer coated substrates.

Unless otherwise indicated herein, the following analytical methods are used in the describing aspects of the present invention:

"Density" is determined in accordance with ASTM D792.

"Melt index": Melt indices $I_2$ (or I2) and $I_{10}$ (or I10) are measured in accordance with ASTM D-1238-04 at 190° C. and at 2.16 kg and 10 kg load, respectively. Their values are reported in g/10 min "Melt flow rate" is used for polypropylene based resins and determined according to ASTM D1238 (230° C. at 2.16 kg).

"Acid content": The acid content of ethylene/(meth)acrylic acid copolymers is measured in accordance with ASTM D4094.

"Acrylate content": The acrylate content of ethylene/(m)ethacrylate copolymers is measured in accordance with ASTM D4094.

Additional properties and test methods are described further herein. In one aspect, the present invention provides a polymer blend that comprises a copolymer comprising (a) a copolymer comprising ethylene and at least one of acrylic acid and methacrylic acid having an acid content of 2 to 21 weight percent based on the weight of the copolymer, wherein the amount of copolymer (a) comprises 20-80 weight percent of the blend based on the total weight of the blend, and (b) a copolymer comprising ethylene and at least one of methyl acrylate and ethyl acrylate having an acrylate content of 5 to 30 weight percent based on the weight of the copolymer, wherein the amount of copolymer (b) comprises 10 to 50 weight percent of the blend based on the total weight of the blend, wherein the amount of copolymer (a) and copolymer (b) is at least 70 weight percent of the blend based on the total weight of the blend. In some embodiments, the polymer blend comprises 40-70 weight percent of copolymer (a) based on the total weight of the blend. The polymer blend comprises 30-50 weight percent of copolymer (b) based on the total weight of the blend. In some embodiments, the amount of copolymer (a) and copolymer (b) is at least 80 weight percent of the blend based on the total weight of the blend. The amount of copolymer (a) and copolymer (b) is at least 90 weight percent of the blend based on the total weight of the blend, in some embodiments. In some embodiments, the melt index ($I_2$) ratio of copolymer (a) to copolymer (b) ($I_2$ of copolymer (a)/I2 of copolymer (b)) is greater than 2.

In another aspect, a polymer blend of the present invention comprises (a) a copolymer comprising ethylene and at least one of acrylic acid and methacrylic acid having an acid content 2 to 21 weight percent based on the weight of the copolymer and having a melt index ($I_2$) of 1 to 40 g/10 minutes, wherein the amount of copolymer (a) comprises 1 to 90 weight percent of the blend based on the total weight of the blend, and (b) a copolymer comprising ethylene and at least one of methyl acrylate and ethyl acrylate having an acrylate content 5 to 30 weight percent based on the weight of the copolymer and having a melt index ($I_2$) of 0.5 to 20 g/10 minutes, wherein the amount of copolymer (b) comprises 1 to 50 weight percent of the blend based on the total weight of the blend, wherein the melt index ratio of copolymer (a) to copolymer (b) ($I_2$ of copolymer (a)/$I_2$ of copolymer (b)) is greater than 2. In some embodiments, the melt index ($I_2$) of copolymer (a) is 1 to 25 g/10 minutes. The melt index (I2) of copolymer (a), in some embodiments, is 0.4 to 10 g/10 minutes.

In some embodiments, polymer blends of the present invention further comprise a polyolefin having a density of 0.930 g/cm$^3$ or less. The blend comprises 30 weight percent or less of the polyolefin based on the total weight of the blend in some embodiments, or 20 weight percent or less of the polyolefin based on the total weight of the blend in some embodiments, or 10 weight percent or less of the polyolefin based on the total weight of the blend in some embodiments.

In some embodiments, a polymer blend comprises 50 to 70 weight percent of copolymer (a), 30 to 50 weight percent of copolymer (b), and 0 to 20 weight percent of a polyolefin having a density of 0.930 g/cm$^3$ or less, based on the total weight of the blend.

The polymer blend can comprise a combination of two or more embodiments as described herein.

Embodiments of the present invention also relate to multilayer structures that include a layer formed from a polymer blend of the present invention. In one aspect, a multilayer structure comprises at least two layers, each layer having opposing facial surfaces, wherein Layer A comprises a polymer blend according to any of the embodiments disclosed herein, wherein Layer B comprises a substrate, and wherein a top facial surface of Layer B is in adhering contact with a bottom facial surface of Layer A. In some embodiments, the substrate comprises a metal foil, a metallized film, a woven mat, a nonwoven mat, or a scrim. In some embodiments, the substrate comprises aluminum foil. In some embodiments, the adhesion of Layer A to Layer B is at least 30 N/15 mm when measured according to ASTM D3330.

In some embodiments, the multilayer structure further comprises Layer C, wherein a top facial surface of Layer A is in adhering contact with a bottom facial surface of Layer C. In some such embodiments, Layer C comprises a polyolefin, polyamide, a metal foil, or a metallized film.

Multilayer structures of the present invention comprise a combination of two or more embodiments as described herein.

Embodiments of the present invention also relate to articles comprising any of the multilayer structures (e.g., multilayer films) disclosed herein.

Polymer Blends

Polymer blends according to embodiments of the present invention comprise a copolymer comprising ethylene and at least one of acrylic acid and methacrylic acid having certain features specified herein and a copolymer comprising ethylene and at least one of methyl acrylate and ethyl acrylate having certain features as specified herein. For ease of reference, the copolymer comprising ethylene and at least one of acrylic acid and methacrylic acid will also be referred to herein as "ethylene/(meth)acrylic acid copolymer" with the understanding that some such copolymers can comprise both acrylic acid monomer and methacrylic acid monomer. In addition, for ease of reference, the copolymer comprising ethylene and at least one of methyl acrylate and ethyl acrylate will also be referred to herein as "ethylene/(m)ethyl acrylate copolymer" with the understanding that some such copolymers can comprise both methyl acrylate monomer and ethyl acrylate monomer.

The ethylene/(meth)acrylic acid copolymer used in embodiments of the present invention is characterized as a random copolymer. Such ethylene/(meth)acrylic acid copolymers can be prepared at high pressure by the action of a free-radical polymerization initiator, acting on a mixture of ethylene and acrylic acid and/or methacrylic acid monomers using techniques known to those of skill in the art. The ethylene/(meth)acrylic acid copolymers used in polymer blends of the present invention are more precisely referred to as interpolymers because they are formed by the polymerization of a mixture of the comonomers, in contradistinction to copolymers made by "grafting" or "block-polymerization" methods.

The ethylene/(meth)acrylic acid copolymer used in some embodiments of the present invention can be characterized as having an acid content of 2 to 21 weight percent based on the weight of the copolymer. The ethylene/(meth)acrylic acid copolymer has an acid content of 6 to 21 weight percent based on the weight of the copolymer in some embodiments. The ethylene/(meth)acrylic acid copolymer has an acid content of 10 to 21 weight percent based on the weight of the copolymer in some embodiments.

The ethylene/(meth)acrylic acid copolymer may further be characterized as having a melt index ($I_2$) of 1 to 40 g/10 minutes in some embodiments. All individual values and subranges between 1 and 40 g/10 minutes are included herein and disclosed herein. For example, the ethylene/(meth)acrylic acid copolymer can have a melt index from a lower limit of 1, 5, 10, 15, or 20 g/10 minutes to an upper limit of 10, 15, 20, 25, 30, 35, or 40 g/10 minutes. In some embodiments, the ethylene/(meth)acrylic acid copolymer has a melt index ($I_2$) of 1 to 25 g/10 minutes, or 0.4 to 10 g/10 minutes in some embodiments.

The polymer blend comprises 1 to 90 weight percent ethylene/(meth)acrylic acid copolymer based on the weight of the blend in some embodiments. In some embodiments, the polymer blend comprises 20 to 80 weight percent ethylene/(meth)acrylic acid copolymer based on the weight of the blend in some embodiments. In some embodiments, the polymer blend comprises 40 to 70 weight percent of the ethylene/(meth)acrylic acid copolymer based on the weight of the blend.

Examples of commercially available ethylene/(meth)acrylic acid copolymers that can be used in embodiments of the present invention include PRIMACOR™ ethylene/acrylic acid copolymers, which are commercially available from The Dow Chemical Company, Escor ethylene/acrylic acid copolymers commercially available from Exxon Mobil Corp., Nucrel ethylene/methacrylic acid copolymers commercially available from DuPont, and ethylene/methacrylic acid copolymers commercially available from INEOS.

In addition to an ethylene/(meth)acrylic acid copolymer, polymer blends of the present invention further comprise a copolymer comprising ethylene and at least one of methyl acrylate and ethyl acrylate (ethylene/(m)ethyl acrylate copolymer).

The ethylene/(m)ethyl acrylate copolymer used in embodiments of the present invention is characterized as a random copolymer. Such ethylene/(m)ethyl acrylate copolymer can be prepared at high pressure by the action of a free-radical polymerization initiator, acting on a mixture of ethylene and methyl acrylate and/or ethyl acrylate monomers using techniques known to those of skill in the art. The ethylene/(m)ethyl acrylate copolymers used in polymer blends of the present invention are more precisely referred to as interpolymers because they are formed by the polymerization of a mixture of the comonomers, in contradistinction to copolymers made by "grafting" or "block-polymerization" methods.

The ethylene/(m)ethyl acrylate copolymer used in some embodiments of the present invention can be characterized as having an acrylate content of 5 to 30 weight percent based on the weight of the copolymer. The ethylene/(m)ethyl acrylate copolymer has an acrylate content of 10 to 30 weight percent based on the weight of the copolymer in some embodiments. The ethylene/(m)ethyl acrylate copolymer has an acrylate content of 15 to 30 weight percent based on the weight of the copolymer in some embodiments.

The ethylene/(m)ethyl acrylate copolymer may further be characterized as having a melt index ($I_2$) of 0.5 to 20 g/10 minutes in some embodiments. All individual values and subranges between 0.5 and 20 g/10 minutes are included herein and disclosed herein. For example, the ethylene/(m)ethyl acrylate copolymer can have a melt index from a lower limit of 0.5, 0.8, 1, 5, 10, 12, or 15 g/10 minutes to an upper limit of 5, 10, 12, 15, 18, or 20 g/10 minutes. In some embodiments, the ethylene/(m)ethyl acrylate copolymer has a melt index (I2) of 0.5 to 5 g/10 minutes, or 0.5 to 2 g/10 minutes in some embodiments.

The polymer blend comprises 1 to 50 weight percent ethylene/(meth)acrylic acid copolymer based on the weight of the blend in some embodiments. In some embodiments, the polymer blend comprises 10 to 50 weight percent ethylene/(m)ethyl acrylate copolymer based on the weight of the blend in some embodiments. In some embodiments, the polymer blend comprises 30 to 50 weight percent of the ethylene/(m)ethyl acrylate copolymer based on the weight of the blend.

Examples of commercially available ethylene/(m)ethyl acrylate copolymers that can be used in embodiments of the present invention include AMPLIFY™ EA ethylene/ethyl acrylate copolymers which are commercially available from The Dow Chemical Company, and Lotryl ethylene/methyl acrylate copolymers which are commercially available from Arkema.

The ratio of the melt index ($I_2$) of the ethylene/(meth)acrylic acid copolymer to the melt index ($I_2$) of the ethylene/(m)ethyl acrylate copolymer can be important in some embodiments. In particular, it can be important to have a large melt index ($I_2$) difference between the ethylene/(meth)acrylic acid copolymer and the ethylene/(m)ethyl acrylate copolymer. With this difference in melt indices ($I_2$), the ethylene/(meth)acrylic acid copolymer forms a continuous phase with the ethylene/(m)ethyl acrylate copolymer as a dispersed phase. Such a dispersion of ethylene/(m)ethyl acrylate copolymer within the continuous phase of ethylene/(meth)acrylic acid copolymer is believed to provide improved adhesion performance. In some embodiments, the melt index (I2) ratio of ethylene/(meth)acrylic acid copolymer to ethylene/(m)ethyl acrylate copolymer ($I_2$ of ethylene/(meth)acrylic acid copolymer/$I_2$ of ethylene/(m)ethyl acrylate copolymer) is greater than 2. In some embodiments, the melt index ($I_2$) ratio of ethylene/(meth)acrylic acid copolymer to ethylene/(m)ethyl acrylate copolymer ($I_2$ of ethylene/(meth)acrylic acid copolymer/$I_2$ of ethylene/(m)ethyl acrylate copolymer) is greater than 4. In some embodiments, the melt index ($I_2$) ratio of ethylene/(meth)acrylic acid copolymer to ethylene/(m)ethyl acrylate copolymer ($I_2$ of ethylene/(meth)acrylic acid copolymer/$I_2$ of ethylene/(m)ethyl acrylate copolymer) is less than 100.

The polymer blend will primarily comprise ethylene/(meth)acrylic acid copolymer and ethylene/(m)ethyl acrylate copolymer. In some embodiments, the total amount of ethylene/(meth)acrylic acid copolymer and ethylene/(m)ethyl acrylate copolymer will be at least 70 weight percent of the polymer blend based on the total weight of the blend.

The polymer blend will primarily comprise ethylene/(meth)acrylic acid copolymer and ethylene/(m)ethyl acrylate copolymer. The total amount of ethylene/(meth)acrylic acid copolymer and ethylene/(m)ethyl acrylate copolymer will be at least 80 weight percent of the polymer blend based on the total weight of the blend. In some embodiments, the total amount of ethylene/(meth)acrylic acid copolymer and ethylene/(m)ethyl acrylate copolymer will be at least 90 weight percent of the polymer blend based on the total weight of the blend. In some embodiments, the total amount of ethylene/(meth)acrylic acid copolymer and ethylene/(m)ethyl acrylate copolymer will be at least 95 weight percent of the polymer blend based on the total weight of the blend. In some embodiments, the total amount of ethylene/(meth)acrylic acid copolymer and ethylene/(m)ethyl acrylate copolymer will be at least 99 weight percent of the polymer blend based on the total weight of the blend.

In addition to ethylene/(meth)acrylic acid copolymer and ethylene/(m)ethyl acrylate copolymer, polymer blends of the present invention, in some embodiments, may further comprise a polyolefin having a density of 0.930 g/cm³ or less. Such polyolefins can include polymers that comprises, in polymerized form, a majority amount of ethylene or propylene monomer (based on the weight of the polymer), and optionally may comprise one or more comonomers.

In some embodiments, the polyolefin comprises a polyethylene having a density of 0.930 g/cm³ or less. All individual values and subranges from equal to or less than 0.930 g/cm³ are included and disclosed herein; for example, the density of the polyethylene can be equal to or less than 0.930 g/cm³, or in the alternative, equal to or less than 0.920 g/cm³, or in the alternative, equal to or less than 0.900 g/cm³, or in the alternative, equal to or less than 0.0890 g/cm³, or in the alternative, equal to or less than 0.880 g/cm³. When the polyolefin comprises polypropylene, persons of skill in the art can identify an appropriate density for the polypropylene based on the teachings herein.

In some embodiments, the polyolefin has a melt index ($I_2$) of 20 g/10 minutes or less. All individual values and subranges up to 20 g/10 minutes are included herein and disclosed herein. For example, the polyolefin can have a melt index from a lower limit of 0.2, 0.25, 0.5, 0.75, 1, 2, 4, 5, or 10 g/10 minutes to an upper limit of 1, 2, 4, 5, or 10 g/10 minutes. The polyolefin has a melt index ($I_2$) of up to 10 g/10 minutes in some embodiments. The polyolefin has a melt index ($I_2$) of up to 5 g/10 minutes in some embodiments. In some embodiments, the polyolefin has a melt index ($I_2$) less than 3 g/10 minutes.

Polyethylenes that are particularly well-suited for use in some embodiments of the present invention include linear low density polyethylene (LLDPE), low density polyethylene (LDPE), polyolefin elastomers, polyolefin plastomers, and combinations thereof.

When the polyolefin comprises LDPE and/or LLDPE, the density of the LDPE or LLDPE will typically be in the range of 0.916 to 0.935 g/cm³. When the polyolefin comprises polyolefin plastomer or polyolefin elastomer, the density will typically be less than 0.900 g/cm³, and less than 0.880 g/cm³ in some embodiments.

Examples of commercially available LDPE that can be used in embodiments of the present invention include DOW™ LDPE 132i, DOW™ LDPE 150E, DOW™ LDPE 310E, DOW™ LDPE 450E, DOW™ LDPE 4012, and AGILITY™ 1001, as well as other low density polyethylenes, which are commercially available from The Dow Chemical Company. Examples of commercially available LLDPE that can be used in embodiments of the present invention include DOWLEX™ linear low density polyethylene, such as DOWLEX™ 2045, DOWLEX™ 2256G, DOWLEX™ 2049G, DOWLEX™ 2042G, DOWLEX™ 2645G and DOWLEX™ 2740G as well as others, which are commercially available from The Dow Chemical Company. Examples of commercially available polyolefin elastomers that can be used in embodiments of the present invention include ENGAGE™ polyolefin elastomers, such as ENGAGE™ 8100, ENGAGE™ 8107, ENGAGE™ 8842, ENGAGE™ 8180, ENGAGE™ 8150, ENGAGE™ 8157, ENGAGE™ 8003, ENGAGE™ 8440, ENGAGE™ 8480, ENGAGE™ 8540, ENGAGE™ 8450, and ENGAGE™ 8452, as well as others, which are commercially available from The Dow Chemical Company.

Persons of skill in the art can select suitable commercially available polypropylenes for use in polymer blends based on the teachings herein.

In embodiments where such polyolefins are included in the polymer blend, the polymer blend comprises 30 weight percent or less of the polyolefin based on the weight of the blend in some embodiments. In some embodiments, the polymer blend comprises 20 weight percent or less polyolefin based on the weight of the blend in some embodiments. In some embodiments, the polymer blend comprises 10 weight percent or less of the polyolefin based on the weight of the blend. As indicated above, in some embodiments, the polymer blend does not include any such polyolefins.

In some embodiments wherein the polymer blend includes such polyolefins, the polymer blend can comprise 20 to 80 weight percent of ethylene/(meth)acrylic acid copolymer, 10 to 50 weight percent of and ethylene/(m)ethyl acrylate copolymer, and 0 to 30 weight percent of the polyolefin, based on the total weight of the blend. In some embodiments, the polymer blend can comprise 40 to 70 weight percent of ethylene/(meth)acrylic acid copolymer, 30 to 50 weight percent of and ethylene/(m)ethyl acrylate copolymer, and 0 to 30 weight percent of the polyolefin, based on the total weight of the blend. In some embodiments, the polymer blend can comprise 50 to 70 weight percent of ethylene/(meth)acrylic acid copolymer, 30 to 50 weight percent of and ethylene/(m)ethyl acrylate copolymer, and 0 to 20 weight percent of the polyolefin, based on the total weight of the blend.

In some embodiments, the polymer blend can further comprise one or more additives known to those of skill in the art including, for example, antioxidants, colorants, slip agents, antiblocks, processing aids, and combinations thereof. In some embodiments, the polymer blend comprises up to 5 weight percent of such additives. All individual values and subranges from 0 to 5 wt % are included and disclosed herein; for example, the total amount of additives in the polymer blend can be from a lower limit of 0.5, 1, 1.5, 2, 2.5, 3, 3.5, 4, or 4.5 wt % to an upper limit of 1, 2, 3, 4, or 5 wt %.

As will be discussed below, a polymer blend of the present invention can be incorporated/converted into a final fabricated product (e.g., a multilayer structure) via extrusion coating (or other equipment) using techniques known to those of skill in the art based on the teachings herein.

Polymer blends of the present invention can be prepared by melt blending the prescribed amounts of the components with a twin screw extruder before feeding into an extrusion coater (or other equipment) for film fabrication. Such polymer blends can also be prepared by tumble blending the prescribed amounts of the components before feeding into the extrusion coater (or other equipment) for film fabrication. In some embodiments, polymer blends of the present invention can be in the form of pellets. For example, the individual components can be melt blended and then formed into pellets using a twin screw extruder or other techniques known to those of skill in the art based on the teachings herein. In some embodiments, a polymer blend can include the combination of a compounded pellet and additional polymer that is tumble blended before feeding into the extrusion coater. For example, a pellet comprising a blend of ethylene/(meth)acrylic acid copolymer and polyolefin can be tumble blended with ethylene/(m)ethyl acrylate copolymer to provide a polymer blend having the desired weight percentages of ethylene/(meth)acrylic acid copolymer, ethylene/(m)ethyl acrylate copolymer, and polyolefin.

Multilayer Structures

In some embodiments, the present invention relates to multilayer structures in which at least one layer is formed from a polymer blend according to any embodiment disclosed herein. The multilayer structure, in some embodiments, comprises at least two layers, with each having opposing facial surfaces. In such embodiments, a first layer (Layer A) (e.g., a layer comprising a polymer blend of the present invention) is in adhering contact with a second layer (Layer B), with a top facial surface of the second layer (Layer B) being in adhering contact with a bottom facial surface of the first layer (Layer A).

In embodiments wherein a first layer (Layer A) is formed from a polymer blend of the present invention, a second layer (Layer B) can comprise a substrate. Examples of substrates that can be used as the second layer (Layer B) in embodiments of the present invention include metal foils, woven mats (e.g., woven fiber glass mats), nonwoven mats (e.g., nonwoven fiber glass mats), scrims, metallized films (e.g., metallized PET), and polymeric films (e.g., oriented polypropylene, oriented PET, etc.). Polymer blends of the present invention are particularly useful in adhering to metal foils or metallized films. Any metal foil or metallized film may form the substrate onto which the polymer blend layer is applied. Exemplary metal foils include aluminum foil and copper foil. The foil, when present, may, but need not, be flame or corona treated or subjected to other treatment so as to improve wettability and/or adhesion. Exemplary metallized films include metallized PET films, metallized oriented polypropylene films, metallized polyamide films, and metallized polyethylene films. In some embodiments, substrates other than metal foils can also be flame or corona treated or subjected to other treatment so as to improve wettability and/or adhesion. In some such embodiments, the substrates comprise oriented polypropylene or oriented polyamide films. Persons of skill in the art can identify such substrates based on the teachings herein.

In some embodiments, a multilayer structure of the present invention comprises a first layer (Layer A) formed from a polymer blend according to any of the embodiments disclosed herein and a second layer (Layer B) comprising a metal substrate (e.g., a metal foil or a metallized film) in adhering contact with the first layer, wherein the adhesion of the first layer to metal substrate (e.g., metal foil) is at least 30 N/15 mm when measured according to ASTM D3330. In some embodiments, the metal substrate is aluminum foil.

In embodiments wherein the multilayer structure includes a metal foil layer (e.g., an aluminum foil layer), the metal foil has a thickness from 0.20 to 2.0 mil, more preferably from 0.20 to 0.50 mil. All individual values and subranges from 0.20 to 0.50 mil are included and disclosed herein; for example, the metal foil layer thickness can range from a lower limit of 0.20, 0.25, 0.30, 0.35, 0.40 or 0.45 mil to an upper limit of 0.30, 0.35, 0.40, 0.45, or 0.50 mil. For example, the metal foil layer thickness can range from 0.20 to 0.50 mil, or in the alternative, from 0.20 to 0.60 mil, or in the alternative, from 0.60 to 1.0 mil, or in the alternative, from 0.25 to 0.50 mil. To one skilled in the art the thickness of the metal foil layer is defined as sufficient for the application.

In embodiments wherein the multilayer structure includes a metallized film layer (e.g., a metallized PET film, a metallized oriented polypropylene film, a metallized polyamide film, or a metallized polyethylene film), the metallized layer on the film can have a variety of thicknesses depending on factors such as performance (e.g., barrier properties, opacity, etc.) and cost. In some embodiments, the metallized layer on the metallized film layer has a thickness from 3 to 40 nm. All individual values and subranges from 3 to 40 nm are included and disclosed herein; for example, the metallized layer thickness can range from a lower limit of 3, 5, 10, 17, 20, 22, 25, 30, or 35 nm to an upper limit of 10, 12, 15, 20, 23, 25, 32, 35, 37, or 40 nm. To one skilled in the art the thickness of the metallized layer of the metallized film is defined as sufficient for the application.

The layer formed from the polymer blend can be applied to a metal substrate layer (e.g., metal foil) by any acceptable manner, such as extrusion lamination and/or extrusion coating. In extrusion coating the polymer blend layer on the metal substrate layer (e.g., metal foil), in some embodiments, the polymer blends can maintain acceptable levels of neck-in and draw down speed while providing acceptable adhesion to the metal foil layer. Polymer blends of the present invention, in some embodiments, can be extrusion coated on a metal substrate layer at temperatures (e.g., ~300° C. or less) lower than temperatures (e.g., ~320° C.) used when a polymer layer comprising only low density polyethylene is extrusion coated, while still providing acceptable adhesion to the metal substrate. Thus, the ability to extrusion coat at a relatively lower temperature while achieving acceptable adhesion is one advantage of some embodiments of the present invention.

In some embodiments, a layer formed from a polymer blend of the present invention can be in adhering contact with another layer, in addition to a substrate (e.g., in addition to a metal foil layer). For example, in some embodiments, the layer formed from the polymer blend can additionally be in adhering contact with a layer comprising a polyolefin, a polyamide, a metal foil, or a metallized film. That is, in such embodiments, the layer formed from a polymer blend of the present invention can be between the other layer and the substrate (e.g., the metal foil), with a top facial surface of the substrate being in adhering contact with a bottom facial surface of the polymer blend layer, and with a top facial surface of the polymer blend layer being in adhering contact with a bottom facial surface of the other layer (e.g., polyolefin, polyamide, a metal foil, or a metallized film).

In embodiments comprising a polyolefin layer, the polyolefin can be any polyethylene, polypropylene, and their derivatives (e.g., ethylene-propylene copolymer) known to those of skill in the art to be suitable for use as a layer in a multilayer structure based on the teachings herein. For example, the polyethylene that can be used in such a layer, as well as other layers in the multilayer structure, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), homogeneously branched ethylene/α-olefin copolymers made with a single site catalyst such as a metallocene catalyst or a constrained geometry catalyst, and combinations thereof. In some embodiments, polyethylenes used in the polyolefin layer can be made via gas-phase polymerization. In some embodiments, polyethylenes used in the polyolefin layer can be made by gas-phase, solution-phase or slurry polymerization or any combination thereof, using any type of reactor or reactor configuration known in the art.

Some embodiments of multilayer structures can include layers beyond those described above. For example, while not necessarily in adhering contact with a layer formed from a polymer blend according to the present invention (though, in some embodiments, such layers can be in contact with the layer formed from such a polymer blend), a multilayer structure can further comprise other layers typically included in multilayer structures depending on the application including, for example, barrier layers, sealant layers, tie layers, other polyethylene layers, polypropylene layers, etc. Additionally, other layers such as printed, high modulus, high gloss layers may be laminated to multilayer structures (e.g., films) of the present invention. Further, in some embodiments, the multilayer structure can be extrusion coated to a fiber containing substrate such as paper or fiber glass (e.g., nonwoven mats, woven mats, scrims, and the like).

In addition to extrusion coating, multilayer structures of the present invention can be coextruded as blown films or cast films using techniques known to those of skill in the art based on the teachings herein. In some embodiments, multilayer structures of the present invention can also be formed by lamination or by a combination of blown/cast film followed by thermal lamination.

Packaging

In some embodiments, the present invention relates to packaging comprising the multilayer structure of any embodiment disclosed herein. In a particular embodiment, the packaging is a retort and/or sterilization packaging. The packaging may be used to contain, in various embodiments, solids, slurries, liquids, or gasses. By way of example and not limitation, the packaging may be used to contain acidic solutions, corn oil, alcohols, meats, cheeses, sun screen, shampoo, spice, soy sauce, creamer, flavored coffee, milk, juice, detergent, aseptic food, hot fill juice, fatty food, baby wipe, iodine solution, salad dressing, ketchup, sauces, and other items.

Some embodiments of the invention will now be described in detail in the following Examples.

EXAMPLES

The following raw materials are used in the examples discussed below:

| Product | Product (Abbreviation) | Melt Index ($I_2$) (dg/min) | Density (g/cc) | Comonomer Content (weight) |
|---|---|---|---|---|
| DOWLEX ™ 2045 | LLDPE | 1.0 | 0.920 | — |
| ENGAGE ™ 8100 | Polyolefin Elastomer (POE) | 1.0 | 0.870 | — |
| PRIMACOR ™ 3440 | Ethylene/Acrylic Acid Copolymer (EAA) | 11.0 | 0.938 | 9.7% Acrylic Acid |
| LOTRYL 24MA02 | Ethylene/Methyl Acrylate Copolymer (EMA) | 2.0 | 0.940 | 24.0% Methyl Acrylate |
| AMPLIFY ™ EA 100 | Ethylene/Ethyl Acrylate Copolymer (EEA1) | 1.3 | 0.930 | 15.0% Ethyl Acrylate |
| AMPLIFY ™ EA 101 | Ethylene/Ethyl Acrylate Copolymer (EEA2) | 6.0 | 0.931 | 18.5% Ethyl Acrylate |
| ALCUDIA EBA PA-1704 | Ethylene/Butyl Acrylate Copolymer (EBA) | 0.40 | 0.925 | 17% n-Butyl Acrylate |

DOWLEX ™ 2045 is a linear low density polyethylenes commercially available from The Dow Chemical Company.
ENGAGE ™ 8100 is a polyolefin Elastomer commercially available from The Dow Chemical Company.
PRIMACOR ™ 3440 is an ethylene/acrylic acid copolymer commercially available from The Dow Chemical Company.
AMPLIFY ™ EA 100 and AMPLIFY ™ EA 101 are each ethylene/ethyl acrylate copolymers commercially available from The Dow Chemical Company.
LOTRYL 24MA02 is an ethylene/methyl acrylate copolymer commercially available from Arkema Group.
ALCUDIA EBA PA-1704 is an ethylene/butyl acrylate copolymer commercially available from Repsol S.A.

The below examples illustrate the adhesion of polymer blends according to some embodiments of the present invention to an aluminum substrate. The aluminum substrate is conventional aluminum foil having a nominal thickness of 1 mm. In the below examples, Layer A is the polymer blend (or single polymer for some of the Comparative Examples, and Layer B is the aluminum foil substrate.

A variety of multilayer structures are prepared as shown in Table 1:

TABLE 1

| | Layer A (percentages are weight %) | Layer B (Substrate) |
|---|---|---|
| Comparative Example A | 100% PRIMACOR ™ 3440 (EAA) | Aluminum foil |
| Comparative Example B | 100% AMPLIFY ™ EA 100 (EEA) | Aluminum foil |
| Comparative Example C | 60% PRIMACOR ™ 3440 (EAA1) 40% DOWLEX ™ 2045 (LLDPE) | Aluminum foil |
| Comparative Example D | 60% PRIMACOR ™ 3440 (EAA) 40% ALCUDIA EBA PA-1704 (EBA) | Aluminum foil |
| Comparative Example E | 60% PRIMACOR ™ 3440 (EAA) 40% AMPLIFY ™ EA 101 (EEA2) | Aluminum foil |
| Inventive Example 1 | 60% PRIMACOR ™ 3440 (EAA) 40% AMPLIFY ™ EA 100 (EEA1) | Aluminum foil |
| Inventive Example 2 | 60% PRIMACOR ™ 3440 (EAA) 40% LOTRYL 24MA02 (EMA) | Aluminum foil |
| Inventive Example 3 | 80% PRIMACOR ™ 3440 (EAA) 20% LOTRYL 24MA02 (EMA) | Aluminum foil |
| Inventive Example 4 | 70% PRIMACOR ™ 3440 (EAA) 30% LOTRYL 24MA02 (EMA) | Aluminum foil |

TABLE 1-continued

| | Layer A (percentages are weight %) | Layer B (Substrate) |
|---|---|---|
| Inventive Example 5 | 50% PRIMACOR ™ 3440 (EAA) 50% LOTRYL 24MA02 (EMA) | Aluminum foil |
| Inventive Example 6 | 54% PRIMACOR ™ 3440 (EAA) 36% AMPLIFY ™ EA 100 (EEA1) 10% ENGAGE ™ 8100 (POE) | Aluminum foil |
| Inventive Example 7 | 54% PRIMACOR ™ 3440 (EAA) 36% AMPLIFY ™ EA 100 (EEA1) 10% DOWLEX ™ 2045 (LLDPE) | Aluminum foil |

The Layer A components are compounded and extruded on a Leistritz ZSE-27 (Leistritz AG) intermeshing, co-rotating twin screw extruder having a diameter of 28 mm and a length-to-diameter (L/D) ratio of 48. The extruder is equipped with a 34 kW motor and has a maximum screw speed of 1200 rpm to provide an output of 5-30 kg/hour.

The Comparative and Inventive Examples are prepared by heat lamination as follows. 15 grams of the well-mixed polymer blend is placed between two pieces of the aluminum foil substrate, and then the structure is placed between two flat, stainless steel molds. The whole molds are placed into a hot press machine at a temperature of 150° C. under the following conditions: pre-heating time=3 minutes; number of vents=6, final pressing time=1 minute at 50 bars of pressure; cooling time=1 minute.

48 hours after heat lamination, the adhesion (or peel strength) of the polymer blend of Layer A to the aluminum foil substrate is measured according to the T-peel strength configuration of ASTM D3330 using an INSTRON 5566 load frame. 300 mm by 15 mm sample strips are cut from the Comparative and Inventive Example structures for measurement. The adhesion is measured at a peel angle of 180° and a grip separation rate of 100 mm/minute. At least five specimens of each Example are tested.

In addition, the samples are placed into a scanning electron microscope (SEM) and analyzed by a back scattering electron (BSE) detector at an accelerating voltage of 5 kV, a working distance of 6.5 mm, and a spot size of 5. The images of the SEM are reviewed to determine whether the failure in the adhesion test is adhesive failure (Layer A peeled off cleanly from aluminum foil substrate) or cohesive failure (Layer A is not entirely removed from the aluminum foil substrate, but a fibrous fracture is observed).

The results are shown in Table 2:

| | Layer A (% ages are weight %) | Melt Index Ratio of EAA to $2^{nd}$ Component ($I_2$ of EAA/$I_2$ of $2^{nd}$ Comp.) | Peel Strength (N/15 mm) | Failure Mode |
|---|---|---|---|---|
| Comp. Ex. A | 100% EAA | — | 29 | Adhesive |
| Comp. Ex. B | 100% EEA1 | — | 0.4 | Adhesive |
| Comp. Ex. C | 60% EAA 40% LLDPE | 11 | 18 | Adhesive |
| Comp. Ex. D | 60% EAA 40% EBA | 27.5 | 23 | Adhesive |
| Comp. Ex. E | 60% EAA 40% EEA2 | 1.8 | 20 | Adhesive |
| Inv. Ex. 1 | 60% EAA 40% EEA1 | 8.5 | 135 | Cohesive |
| Inv. Ex. 2 | 60% EAA 40% EMA | 5.5 | 81 | Cohesive |
| Inv. Ex. 3 | 80% EAA 20% EMA | 5.5 | 33 | Adhesive |
| Inv. Ex. 4 | 70% EAA 30% EMA | 5.5 | 88 | Cohesive |

-continued

|  | Layer A (% ages are weight %) | Melt Index Ratio of EAA to 2$^{nd}$ Component (I$_2$ of EAA/I$_2$ of 2$^{nd}$ Comp.) | Peel Strength (N/15 mm) | Failure Mode |
|---|---|---|---|---|
| Inv. Ex. 5 | 50% EAA 50% EMA | 5.5 | 80 | Cohesive |
| Inv. Ex. 6 | 54% EAA 36% EEA1 10% POE | — | 86 | Cohesive |
| Inv. Ex. 7 | 54% EAA 36% EEA1 10% LLDPE | — | 38 | Adhesive |

Pure ethylene/acrylic acid copolymer (Comparative Example A) provides good bonding to the aluminum foil substrate, but pure ethylene ethyl acrylate (Comparative Example B) has little bonding. Surprisingly, it was observed that the peel strength of Inventive Example 1 (polymer blend of 60% ethylene/acrylic acid copolymer and 40% ethylene ethyl acrylate) is 4 times higher than that Comparative Example A. Also, when examined under SEM, the failure mode is quite different. For each of the benchmarks, Layer A detached from the aluminum foil substrate, which is an adhesive failure mode. However, for Inventive Example 1, the Layer A is not peeled off from the aluminum foil substrate, but Layer A is torn internally forming a fibrous fracture, which indicates cohesive failure.

The viscosity difference between the ethylene/acrylic acid copolymer and the ethylene/(m)ethyl acrylate copolymer (as expressed by melt index ratio (I$_2$ of EAA divided by I$_2$ of EEA) also affects performance. EEA1 and EEA2 have similar chemistry as both are ethylene/ethyl acrylate copolymers having ethyl acrylate contents of ~15-19 weight percent. However, the melt index (I$_2$) of EEA2 is much higher and closer to the melt index of the ethylene acrylic acid copolymer. Surprisingly, the peel strength of Inventive Example 1 (Melt Index Ratio of 8.5) is over six times larger than the peel strength of Comparative Example E (Melt Index Ratio of 1.8). Thus, in some embodiments, a larger melt index (I2) difference between the ethylene/(meth) acrylic acid copolymer and the ethylene/ethyl acrylate copolymer is desired.

Comparative Examples C and D along with Inventive Examples 1 and 2 illustrate that chemistry of the component combined with the ethylene/(meth)acrylic acid component can also be important. As shown in Comparative Examples C and D, blending with a linear low density polyethylene or an ethylene/butyl acrylate copolymer did not provide the desired higher peel strength, even with similar differences in melt indices (I$_2$) of the components.

Inventive Examples 6 and 7 illustrate that some further non-polar components (e.g., polyolefin elastomer or LLDPE) can be included in the polymer blends and still provide improved performance (higher peel strengths than each of the Comparative Examples). The lower density polyolefin elastomer appeared to have a less significant impact on peel strength than the higher density LLDPE in Inventive Examples 6 and 7.

The invention claimed is:

1. A polymer blend comprising:
   (a) a copolymer consisting of ethylene and at least one of acrylic acid and methacrylic acid having an acid content of 2 to 21 weight percent based on the weight of the copolymer, wherein the amount of copolymer (a) comprises 20-80 weight percent of the blend based on the total weight of the blend; and
   (b) a copolymer consisting of ethylene and at least one of methyl acrylate and ethyl acrylate having an acrylate content of 5 to 30 weight percent based on the weight of the copolymer, wherein the amount of copolymer (b) comprises 10 to 50 weight percent of the blend based on the total weight of the blend,
   wherein the amount of copolymer (a) and copolymer (b) is at least 70 weight percent of the blend based on the total weight of the blend.

2. The polymer blend of claim 1, wherein the melt index (I$_2$) ratio of copolymer (a) to copolymer (b) (I$_2$ of copolymer (a)/I$_2$ of copolymer (b)) is greater than 2.

3. A polymer blend comprising:
   (a) a copolymer consisting of ethylene and at least one of acrylic acid and methacrylic acid having an acid content 2 to 21 weight percent based on the weight of the copolymer and having a melt index (I$_2$) of 1 to 40 g/10 minutes, wherein the amount of copolymer (a) comprises 1 to 90 weight percent of the blend based on the total weight of the blend; and
   (b) a copolymer consisting of ethylene and at least one of methyl acrylate and ethyl acrylate having an acrylate content 5 to 30 weight percent based on the weight of the copolymer and having a melt index (I$_2$) of 0.5 to 20 g/10 minutes, wherein the amount of copolymer (b) comprises 1 to 50 weight percent of the blend based on the total weight of the blend,
   wherein the melt index ratio of copolymer (a) to copolymer (b) (I$_2$ of copolymer (a)/I$_2$ of copolymer (b)) is greater than 2.

4. The polymer blend of claim 1 further comprising a polyolefin having a density of 0.930 g/cm$^3$ or less.

5. The polymer blend of claim 4, wherein the blend comprises 30 weight percent or less of the polyolefin based on the total weight of the blend.

6. The polymer blend of claim 1, wherein the blend comprises 50 to 70 weight percent of copolymer (a), 30 to 50 weight percent of copolymer (b), and 0 to 20 weight percent of the polyolefin, based on the total weight of the blend.

7. A multilayer structure comprising at least two layers, each layer having opposing facial surfaces, wherein:
   Layer A comprises the polymer blend of claim 1; and
   Layer B comprises a substrate, wherein a top facial surface of Layer B is in adhering contact with a bottom facial surface of Layer A.

8. The multilayer structure of claim 7, wherein the substrate comprises a metal foil, a metallized film, a woven mat, a nonwoven mat, or a scrim.

9. The multilayer structure of claim 8, wherein the substrate comprises aluminum foil.

10. The multilayer structure of claim 7, further comprising Layer C, wherein a top facial surface of Layer A is in adhering contact with a bottom facial surface of Layer C.

11. The multilayer structure of claim 10, wherein Layer C comprises a polyolefin, a polyamide, a metal foil, or a metallized film.

12. The multilayer structure of claim 7, wherein the adhesion of Layer A to Layer B is at least 30 N/15 mm when measured according to ASTM D3330.

13. A multilayer structure comprising at least two layers, each layer having opposing facial surfaces, wherein:

Layer A comprises the polymer blend of claim 3; and

Layer B comprises a substrate, wherein a top facial surface of Layer B is in adhering contact with a bottom facial surface of Layer A.

14. The multilayer structure of claim 13, wherein the substrate comprises a metal foil, a metallized film, a woven mat, a nonwoven mat, or a scrim.

15. The multilayer structure of claim 13, wherein the substrate comprises aluminum foil.

16. The multilayer structure of claim 13, further comprising Layer C, wherein a top facial surface of Layer A is in adhering contact with a bottom facial surface of Layer C.

17. The multilayer structure of claim 13, wherein Layer C comprises a polyolefin, a polyamide, a metal foil, or a metallized film.

18. The multilayer structure of claim 13, wherein the adhesion of Layer A to Layer B is at least 30 N/15 mm when measured according to ASTM D3330.

* * * * *